US008572744B2

(12) United States Patent
Day et al.

(10) Patent No.: US 8,572,744 B2
(45) Date of Patent: Oct. 29, 2013

(54) INFORMATION SECURITY AUDITING AND INCIDENT INVESTIGATION SYSTEM

(75) Inventors: Christopher Day, Biscayne Park, FL (US); Cem Gurkok, Coral Gables, FL (US)

(73) Assignee: SteelCloud, Inc., Ashburn, VA (US)

( * ) Notice: Subject to any disclaimer, the term of this patent is extended or adjusted under 35 U.S.C. 154(b) by 2777 days.

(21) Appl. No.: 11/120,023

(22) Filed: May 2, 2005

(65) Prior Publication Data
US 2006/0248591 A1    Nov. 2, 2006

(51) Int. Cl.
G06F 11/00    (2006.01)
(52) U.S. Cl.
USPC .............................................. 726/25; 726/23
(58) Field of Classification Search
USPC ...................................................... 726/23, 25
See application file for complete search history.

(56) References Cited

U.S. PATENT DOCUMENTS

| | | | | |
|---|---|---|---|---|
| 5,032,979 A * | 7/1991 | Hecht et al. | ..................... | 726/25 |
| 6,446,136 B1 | 9/2002 | Pohlmann et al. | | |
| 6,466,932 B1 | 10/2002 | Dennis et al. | | |
| 6,578,076 B1 | 6/2003 | Putzolu | | |
| 6,636,972 B1 * | 10/2003 | Ptacek et al. | ..................... | 726/6 |
| 6,738,970 B1 | 5/2004 | Kruger et al. | | |
| 6,768,988 B2 | 7/2004 | Boreham et al. | | |
| 6,785,686 B2 | 8/2004 | Boreham et al. | | |
| 7,103,149 B1 * | 9/2006 | Depaolantonio | ............ | 379/9.02 |
| 7,340,776 B2 * | 3/2008 | Zobel et al. | ..................... | 726/24 |
| 2005/0120027 A1 * | 6/2005 | Ter Horst | ..................... | 707/100 |
| 2005/0257267 A1 * | 11/2005 | Williams et al. | ................. | 726/25 |
| 2006/0059031 A1 * | 3/2006 | Hertel-Szabadi et al. | ...... | 705/10 |

OTHER PUBLICATIONS

*Locating a user's group memberships in Lightweight Directory Access Protocol*; http://publib.boulder.ibm.com/infocenter/ws60help/index.jsp?topic=/com.ibm.websphere.base.doc/info/aes/ae/csec_directindirectldap.html.
*Enterprise Security Reporter*; http://www.scriptlogic.com/products/enterprisesecurityreporter/main.asp.
*Systems Management Tools*; http://rippletech.com/products/system-managementdetails.html.
*NETIQ Vulnerability Manager*; http://www.netiq.com/products/vsm/default.asp.

* cited by examiner

*Primary Examiner* — Samson Lemma
(74) *Attorney, Agent, or Firm* — Steven M. Greenberg, Esq.; Carey, Rodriquez, Greenberg & O'Keefe, LLP

(57) ABSTRACT

An information security auditing and incident investigation method can include applying a correlation template to query different audit targets in an enterprise system to provide a complete result set for the query across different audit targets, receiving audit data provided in response to the query and rendering the audit data to produce an audit report. The applying step can include distributing one or more distributed audit and response tools to each of the targets in the enterprise and communicating with the targets in the enterprise to acquire audit data from each of the targets. The receiving step can include organizing the audit data in a hierarchy, and recursively walking the hierarchy as a directed, cyclic graph noting memberships and paths. Finally, the rendering step can include generating a graphical visualization interface, disposing a real-time object browser within the interface, and further disposing a differential report in the interface.

16 Claims, 3 Drawing Sheets

INFORMATION SECURITY AUDITING AND INCIDENT INVESTIGATION SYSTEM

BACKGROUND OF THE INVENTION

1. Field of the Invention

The present invention relates to the field of information security and more particularly the present invention relates to compliance auditing for information security and security incident investigation in an enterprise computing system.

2. Description of the Related Art

Information technologists constantly struggle to protect internal computing assets from harm. Threats generally are perceived as external threats including viruses, Trojan logic, spy-ware, and the like. These external attacks mainly are aimed to disrupt business and to cripple the ability of the network to function. In fact, in several high-profile reported instances, hackers have been able to hijack powerful computing servers from which large-scale attacks have been launched to have a global impact upon the Internet. Hence, information technologists have spent considerable sums arming themselves with technology designed to prevent external intrusions, starting at the perimeter to the global Internet.

Today, preventative measures, for instance firewall appliances, virtual private networks, anti-virus logic, intrusion detection systems and newer intrusion prevention technologies have become commonplace within network architectures. These technologies have proven their value in protecting computing assets from external threats. Perimeter based protection, however, has resulted in "tootsie roll" architecture in which hard shells have been formulated to protect computing assets from threats from the outside world, while the interior portion within perimeter can be characterized only as soft. In this regard, internally most computing networks lack policies for control and access of data and few tracking mechanisms exist to monitor user activities internally.

Recently, a disturbing trend has emerged which poses far greater a threat than typical external attacks. The trusted internal user now threatens the integrity of the enterprise by exercising malicious intent while accessing privileged, soft, internal portions of trusted systems enjoy minimal security at best according to the tootsie-roll paradigm. Yet, data manipulation by trusted users can be far more damaging than any external threat. Notably, malicious activity performed by internal users—for instance changes in access permissions—can be subtle and disguised as normal activity with few footprints to alert system administrators.

In the case of publicly traded companies, where sensitive data must be reported to investors in a coordinated, timely manner, the effects of a breach of data security can be devastating and can result in the criminal prosecution of the company. However, traditional security measures cannot protect the greatest asset of a company—its critical, financial, customer and proprietary data. Despite the existence of policies and procedures, there remains little protection from internal fraud through the use of enterprise computing assets.

Importantly, the need to control data and access to data in the enterprise has become of paramount consideration due to recent United States government mandates addressing the distribution and control of information in publicly traded companies. With legislation, such as Sarbanes-Oxley and the Health Insurance Portability and Accountability Act, new regulatory environments have been created with respect to information security. Consequently, many organizations are struggling to extract the necessary information from increasingly complex information systems to ensure compliance.

In addition to the compliance component of various legislative initiatives, many organizations impose a requirement that information security policy and procedure breaches are thoroughly investigated. Given that all computing applications operate in an operating system environment such as a stand-alone operating system or a virtual machine, the operating system environment, if insecure, can become the weak link in the security chain. Notwithstanding, few, if any, operating systems today provide adequate tools for answering critical and, in many industries, legislatively mandated questions with regard to which users enjoy a particular level of access to a particular type data or resource in the enterprise.

Modern operating system environments utilize hierarchical structures for storing user and access permission data for an enterprise. Typically, information relating to user and access permissions can be accessed within the hierarchical structure through a directory mechanism. As with any scalable directory system, however, as the operating environments becomes large and globally distributed, the hierarchy can become embedded with deep objects, users, and groups nested in other object containers such as organizational units. Beyond a certain threshold, it can be difficult to extract meaningful security related information from the hierarchy. Accordingly, due in part to the growing web of interrelated objects and the trust relationships between those objects, questions such as who has effective administrator access to the operating environment or who can access a specific file can become nearly impossible for organizations to answer with available tools.

Furthermore, to aggravate matters, much of the information that is available and readily accessible within the hierarchy can be irrelevant, buried in the 'noise' of a rush of irrelevant data. Alternatively, the information can be considered important only within the context of a correlated data set. In other words, not only is the important data difficult to extract from today's operating systems, but also the important data often can be lost in a flood of uncorrelated and raw data. Unless an auditor or examiner explicitly seeks specific information indicative of interesting, anomalous events (such as a user in accounting which user suddenly gains administrator privileges due to a system compromise and privilege elevation attack) are often not noticed until it is too late or never at all.

BRIEF SUMMARY OF THE INVENTION

The present invention combines automated information auditing for security and regulatory compliance with an investigative tool set designed to properly investigate audit compliance deviations and security incidents. The system can overcome many of the deficiencies of conventional systems and tools by utilizing an advanced data extraction model coupled with an expert correlation system to crawl wide and deep through complex network systems to ensure that relevant data are gathered. The system subsequently can present the data, not in a raw form which requires an expert human to interpret, but rather as higher level answers to security related questions understandable by one not an expert in operating systems or information security practice.

The system of the present invention can include one or more distributed audit and response tools coupled to a corresponding audit target in a computer communications network. The system also can include a distributed audit and response tool manager communicatively linked to each of the distributed audit and response tools over the computer communications network. The system yet further can include data extraction logic configured to acquire audit data for corresponding audit targets in the computer communications network. Finally, the system can include at least one correlation template programmed to group and define query sets for the audit data for a unified query across interrelated sets of the audit data.

Each of the distributed audit and response tools can include logic to establish a secure communications link with the distributed audit and response tool manager. As well, each of the distributed audit and response tools also can include a command and control language interpreter programmed to interpret commands received from the distributed audit and response tool manager. The data extraction logic, in turn, can include a recursion engine programmed to crawl through audit data in an audit target in the computer communications network to acquire the audit data. In particular, the recursion engine can be programmed to model the audit data as a directed, cyclic graph and to recursively traverse the directed, cyclic graph to acquire the audit data.

Finally, the system can include a guided visualization interface including a real-time object browser for the audit data and a display of differential exceptions computed for the audit data. For example, the differential exceptions can include differences from a baseline configuration for the audit data. The display yet further can include a relationship graph of the audit data. The relationship graph can include, for example, highlighted portions for the differences.

An information security auditing and incident investigation method can include applying a correlation template to query different audit targets in an enterprise system to provide a complete result set for the query across different audit targets, receiving audit data provided in response to the query and rendering the audit data to produce an audit report. The applying step can include distributing one or more distributed audit and response tools to each of the targets in the enterprise and communicating with the targets in the enterprise to acquire audit data from each of the targets. The receiving step can include organizing the audit data in a hierarchy, and recursively walking the hierarchy as a directed, cyclic graph noting memberships and paths.

Finally, the rendering step can include generating a graphical visualization interface, disposing a real-time object browser within the graphical visualization interface, and further disposing a differential report in the graphical visualization interface. Also, the rendering step can include generating a graphical visualization interface, disposing a real-time object browser within the graphical visualization interface, further disposing a real-time object browser within the graphical visualization interface, and further disposing a relationship graph in the graphical visualization interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention is a method, system and computer program product for information security auditing and incident investigation. In accordance with the present invention, audit data can be acquired for different audit targets in an enterprise computing system. Once acquired, the audit data can be organized into hierarchy, for instance a directed, cyclic graph. The hierarchy can be traversed recursively such that a correlation template can be established to correlate complex query sets against the audit data. The results of the query sets, in turn, can be rendered within a graphical visualization interface.

Figure 1:
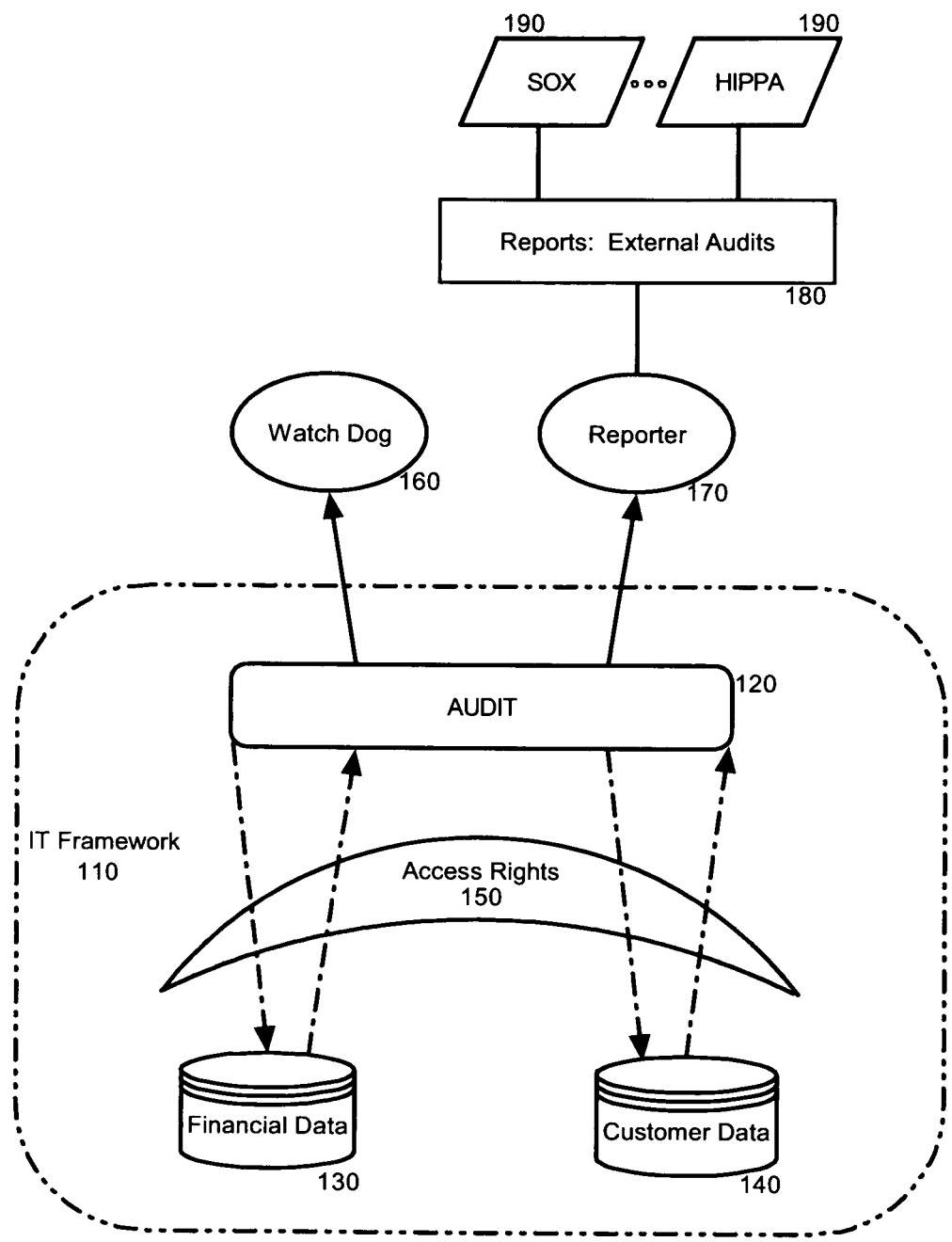
FIG. 1 is a pictorial illustration of an information security auditing and incident investigation system.

As an example, FIG. 1 is a pictorial illustration of an information security auditing and incident investigation system which has been configured in accordance with the present invention. In the example of FIG. 1, an enterprise computing framework 110 can include both financial data 130 and customer data 140. A set of access rights 150 can regulate access to the financial data 130 and the customer data 140. Auditing logic 120 can acquire audit data for the access rights 150 which audit data can be correlated and provided both to a watch dog service 160 and a reporting tool 170. The reporting tool 170, in turn, can provide reporting data 180 for use in satisfying one or more auditing functions 190.

Figure 2:
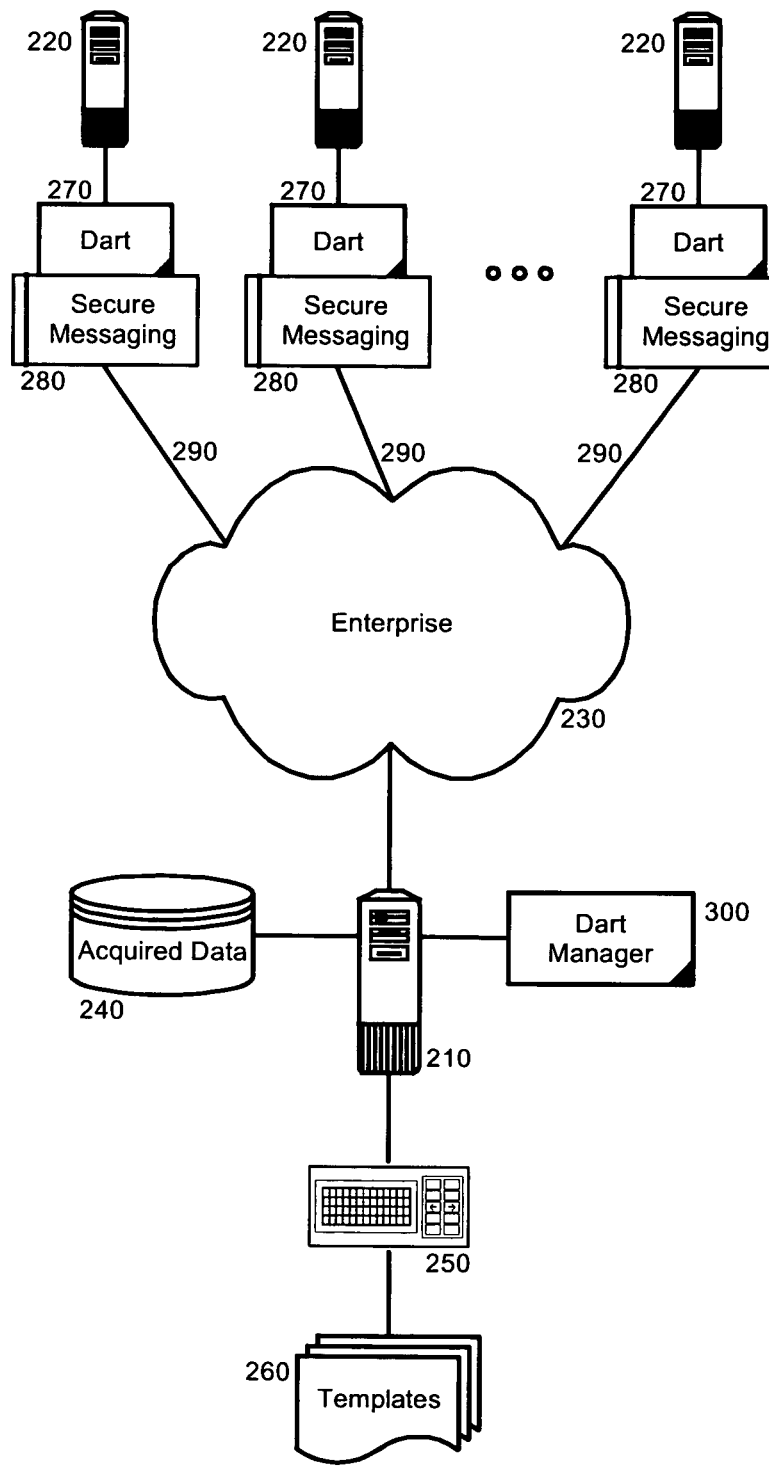
FIG. 2 is a schematic illustration of a three-tier implementation of the information security auditing and incident investigation system of FIG. 1; and, FIG. 3 is a flow chart illustrating a process for information security auditing and incident investigation in the three-tier implementation of FIG. 2.

The auditing logic 120 can include a three-tier architecture as shown in FIG. 2. The three-tiers can include one or more self-installing logical agents 270 referred to as distributed audit and response tools, a distributed audit and response tool manager 300, and a database 240 to store the gathered information and generated reports. The distributed audit and response tools 270 can be coupled to one or more audit targets 220 communicatively linked over the enterprise 230 to a host computing platform 210 hosting the distributed audit and response tools manager 300. Notably, the distributed audit and response tools 270 can include a messaging subsystem 280 implementing encryption and authentication to ensure the security of communications and data between the distributed audit and response tools 270 and the distributed audit and response tools manager 300.

When an audit target 220 has been identified, a corresponding one of the distributed audit and response tools 270 can be installed on the audit target 220 by an auto-installer subsystem of the distributed audit and response tools manager 280 as a persistent service or process. At the time of installation, the distributed audit and response tool 270 can be sent to the audit target 220 with a unique digital certificate. After installation is complete, the distributed audit and response tool 270 can authenticate to its designated distributed audit and response tools manager 300, using its certificate and the certificate of the distributed audit and response tools manager 300, and an encrypted network connection can be established.

The connection then can be used to carry commands in a command and control language (CCL). In this regard, the distributed audit and response tools 270 can include a CCL interpreter and the CCL can be used by the distributed audit and response tools manager 300 and the distributed audit and response tools 270 to process requests for information regarding the audit target 220, to reply to the requests for information regarding the audit target 220, to manage the behavior of the distributed audit and response tools 270, and to monitor overall system health of the distributed audit and response tools 270.

A series of correlation templates 260 can be provided for the operator to group objects and query sets together. Each of the correlation templates 260 can include two components. In the first component, desired audit functions can be grouped together to produce a higher-level query for auditing a particular characteristic or feature of the audit targets 220. In the second component, an expected set of characteristics or features for the audit targets 220 can be listed. In this way, the result set from the higher-level query can be compared to the expected set of characteristics to determine whether an exception has occurred.

Once a correlation template 260 has been created, the correlation template 260 can then be applied to target groupings of audit targets 220 such as the entire enterprise or subsets thereof, including for example, Web servers or mail servers. The correlation template acts 260 as the input parameters to the distributed audit and response tools manager 300 so it will be known which distributed audit and response tools 270 are implicated by the queries of the correlation template 260. The distributed audit and response tools 270 in turn can gather the requested audit data from the corresponding audit targets 220 and can provide the gathered audit data to the distributed audit and response tools manager 300 for aggregation, correlation, database insertion, and reporting (including exception reports).

Hence, the correlation templates 260 can provide a simple way to build complex queries regarding interrelated data and objects. Utilizing the correlation templates 260, an operator is not required to maintain a deep technical understanding of the target operating system or how data and objects relate in potentially complex ways. Rather, the use of correlation templates 260 provides a way to provide simple answers to complex questions regarding the security and compliance posture of an organization's infrastructure.

In a particular aspect of the present invention, a recursion engine (not shown) can be included in the distributed audit and response tools manager 300. The recursion engine can treat the process of data acquisition as a directed, cyclic graph that must be walked noting memberships and paths. In this regard, audit data within a corresponding audit target 220 such as directory entries in an access control hierarchy, can be extracted by organizing the audit data into a hierarchy. Subsequently, the hierarchy can be walked to ensure completeness. Consequently, the recursion engine within the distributed audit and response tools manager 300 can handle graph loops caused by poorly architected networks.

A graphical visualization interface 250 can be provided for administrators, auditors and operators to configure auditing parameters, schedule jobs, browse returned data, and view reports. In this regard, the audit data extracted by the distributed audit and response tools 270 can be presented in the guided visualization interface 250 in various ways including through a real-time object browser, through a differential exception report, and through graphical relationship graphs. The object browser can provide an operator with the ability to further explore the presented data space and to bring various incident response and investigation tools on line to examine curious or suspicious activity and preserve evidence, if necessary.

The differential reports, by comparison, can indicate changes in baseline configurations or activity, thus highlighting events worthy of attention. For instance, where particular files or registry settings are expected within selected ones of the audit targets 220 as specified by the correlation template 260, those portions of the audit targets 220 which are lacking in the expected files or registry settings can be highlighted in the differential report. Likewise, the unexpected presence of a file or registry setting in an audit target 220 can be noted. Finally, the relationship graphs can visually demonstrate how objects are related to each other—a view that can greatly increase understanding of complex relationships and highlight unintended consequences of configurations in an environment.

Figure 3:
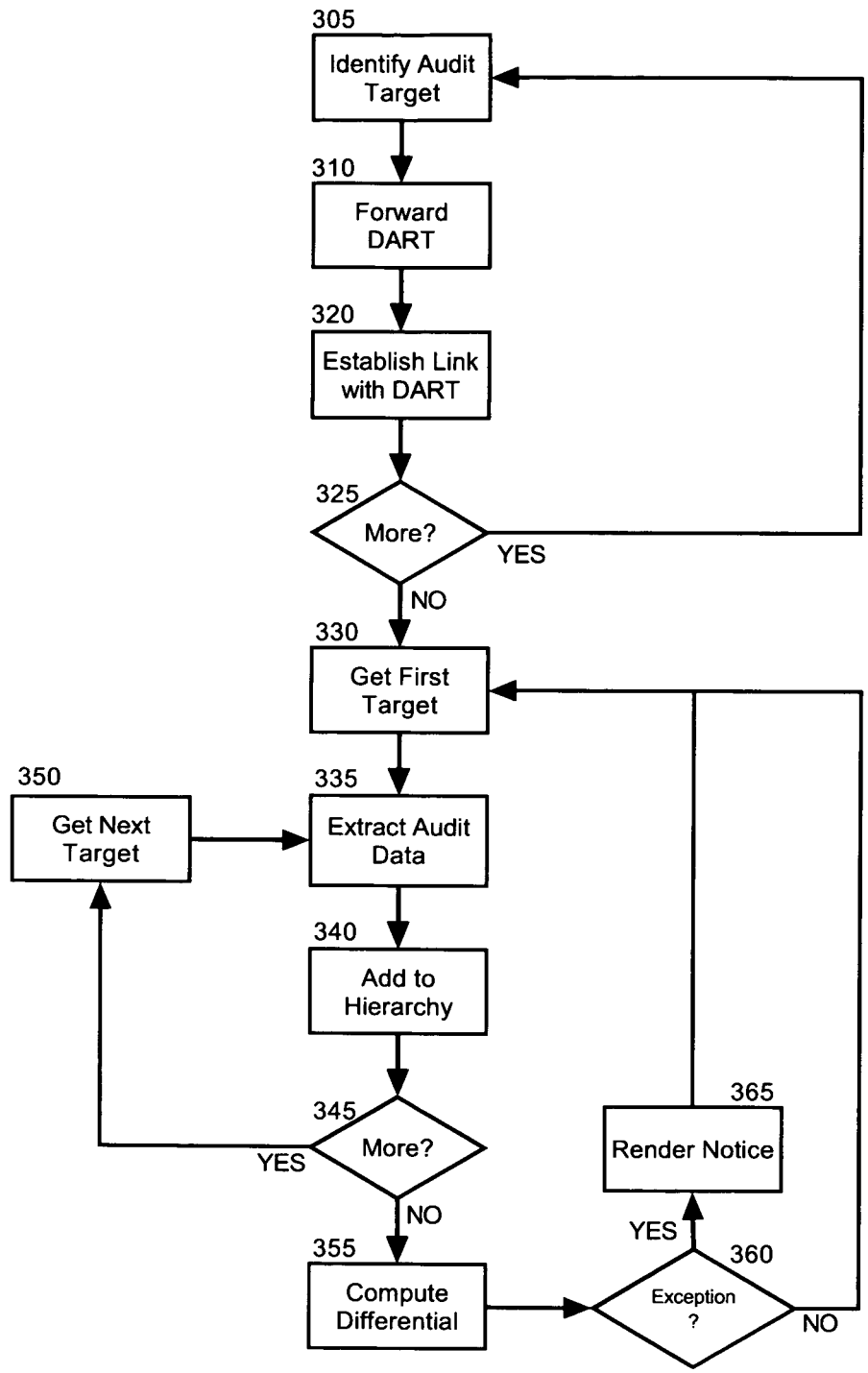

In further illustration, FIG. 3 is a flow chart illustrating a process for information security auditing and incident investigation in the three-tier implementation of FIG. 2. Beginning in block 305, an audit target can be identified in the enterprise. The audit target can include, for example, a computing host, such as a complete server or set of servers, and a computing resource such as a database, file or application. In block 310, the distributed audit and response tool can be forwarded and installed in the audit target. Subsequently, in block 320 a communicative link can be established between the distributed audit and response tool and management logic for the distributed audit and response tool. If in decision block 325 more audit targets remain to be identified, the process can repeat through block 305.

Once the audit targets have been identified and corresponding distributed audit and response tools have been installed in the identified audit targets, the auditing of the corresponding audit targets can commence. Specifically, in decision block 330 a first audit target can be referenced and in block 335, audit data can be extracted from the audit target. The audit data can include, for example, authorized users of the audit target and respective permissions for accessing the audit target. In block 340, a hierarchy of audit data can be populated with the extracted audit data. For instance, the hierarchy can be organized into a directed, cyclic graph which can be traversed recursively to ensure completeness when searching for audit data within the hierarchy. If in decision block 345 more audit targets remain to be processed, in block 350 a next audit target can be referenced and the process can repeat through block 335.

Once the audit data has been extracted from the audit target, in block 355 a differential can be computed as between a known defined state of the hierarchy for a particular property or properties and the computed state based upon the extracted audit data. Where differences in any property or properties can be identified in decision block 360, an exception condition can occur and the differences in the property or properties can be highlighted in block 365 in a graphical visualization interface. In either case, the process can continue in block 330 wherein a new set of audit data can be acquired for analysis in the system of the present invention.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embodied in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An information security auditing and incident investigation system comprising:
   a plurality of distributed audit and response tools, each of said tools having a coupling to a corresponding audit target in a computer communications network;
   a distributed audit and response tool manager communicatively linked to each of said distributed audit and response tools over said computer communications network;
   data extraction logic coupled to said distributed audit and response tool manager and configured to acquire information security audit data for corresponding audit targets via their respective audit and response tools; and,
   at least one correlation template programmed to group and define query sets for said information security audit data for a unified query across interrelated sets of said information security audit data.

2. The system of claim 1, wherein each of said distributed audit and response tools comprises logic to establish a secure communications link with said distributed audit and response tool manager.

3. The system of claim 1, wherein each of said distributed audit and response tools comprises a command and control language interpreter programmed to interpret commands received from said distributed audit and response tool manager.

4. The system of claim 1, wherein said data extraction logic comprises a recursion engine programmed to crawl through information security audit data in an audit target in said computer communications network to acquire said information security audit data.

5. The system of claim 4, wherein said recursion engine is programmed to model said information security audit data in said audit target as a directed, cyclic graph and to recursively traverse said directed, cyclic graph to acquire said information security audit data.

6. The system of claim 1, further comprising a guided visualization interface comprising a real-time object browser for said information security audit data and a display of differential exceptions computed for said information security audit data.

7. The system of claim 6, wherein said differential exceptions comprises differences from a baseline configuration for said information security audit data.

8. The system of claim 7, wherein said display comprises a relationship graph of said information security audit data comprising highlighted portions for said differences.

9. An information security auditing and incident investigation method comprising the steps of:
   distributing a plurality of distributed audit and response tools to each of a plurality of audit targets in an enterprise system;
   reading a correlation template to query different audit targets via their respective audit and response tools, so as to provide a complete result set for said query across said different audit targets;
   communicating with selected ones of said audit targets upon said correlation template to acquire said information security audit data from each of said audit targets via their respective audit and response tools; and
   receiving information security audit data provided in response to said query; and,
   rendering said information security audit data to produce an audit report.

10. The method of claim 9, wherein said receiving step comprises the steps of:
    organizing said acquired information security audit data in a hierarchy; and,
    recursively walking said hierarchy as a directed, cyclic graph noting memberships and paths.

11. The method of claim 9, wherein said rendering step comprises the steps of:
    generating a graphical visualization interface (GVI);
    disposing a real-time object browser within said GVI; and,
    further disposing a differential report in said GVI.

12. The method of claim 9, wherein said rendering step comprises the steps of:
    applying a correlation template to query audit targets in an enterprise system;
    receiving information security audit data provided in response to said query; and,
    rendering said information security audit data to produce an audit report.

13. A computer program product comprising a computer storage medium having a computer readable program, wherein the computer readable program when executed on a computer causes the computer to:
    distributing a plurality of distributed audit and response tools to each of a plurality of audit targets in an enterprise system;
    reading a correlation template to query different audit targets via their respective audit and response tools, so as to provide a complete result set for said query across said different audit targets;
    communicating with selected ones of said audit targets, via their respective audit and response tools, upon said correlation template to recursively acquire information security audit data for said audit targets via their respective audit and response tools;
    and,
    rendering results from said query to produce an audit report.

14. The computer program product of claim 13, wherein said receiving step comprises the steps of:
    organizing said acquired information security audit data in a hierarchy; and,
    recursively walking said hierarchy as a directed, cyclic graph noting memberships and paths.

15. The computer program product of claim 13, wherein said rendering step comprises the steps of:
    generating a graphical visualization interface (GVI); disposing a real-time object browser within said GVI; and,
    further disposing a differential report in said GVI.

16. The computer program product of claim 13, wherein said rendering step comprises the steps of:

rendering said information security audit data to produce an audit report.

\* \* \* \* \*